United States Patent [19]

Otrusina

[11] Patent Number: 5,201,858
[45] Date of Patent: Apr. 13, 1993

[54] QUICK-RELEASE CONNECTOR

[76] Inventor: Edward C. Otrusina, 8118 Nueport. Dr. South, Willow Springs, Ill. 60480

[21] Appl. No.: 925,862

[22] Filed: Aug. 7, 1992

[51] Int. Cl.$^5$ .............................................. A45F 5/00
[52] U.S. Cl. .................................... 24/597; 24/3 R; 24/3 F; 24/702; 224/197; 224/272
[58] Field of Search .................. 24/3 R, 3 F, 109, 597, 24/702, 669, 643, 652; 224/197, 271, 272

[56] References Cited

U.S. PATENT DOCUMENTS 3,570,078  3/1971  Neumann et al. .................... 24/652

Primary Examiner—James R. Brittain
Attorney, Agent, or Firm—Emrich & Dithmar

[57] ABSTRACT

A quick-release connecting apparatus for detachably interconnecting two objects includes male and female members, respectively attachable to the objects. The female member has a generally U-shaped receptacle formed therein which opens at a peripheral edge thereof, and an aperture formed in the front surface of the female member which is aligned with but smaller than the receptacle and communicates therewith. The male member has a stud projection therefrom with a part-circular head at its distal end which is too large to pass through the aperture but is dimensioned to be received in the receptacle from its open end with the stud disposed through the aperture and is rotatable about the axis of the stud while disposed in the receptacle. A spring-biased pawl is mounted on the female member for movement between a locking position projecting into the entrance of the receptacle and a release position out of the entrance. The button moves the pawl out of the way upon insertion into the receptacle to permit insertion in any orientation, but the pawl prevents removal of the head from the receptacle except when it is in a single orientation wherein the straight side faces the pawl. Both reciprocating and pivoting pawls are disclosed.

20 Claims, 2 Drawing Sheets

QUICK-RELEASE CONNECTOR

BACKGROUND OF THE INVENTION

1. Field of the Invention

The present invention relates to connecting or fastening devices, and particularly to a connecting apparatus that permits two objects to be quickly and detachably interconnected.

2. Description of the Prior Art

A number of connecting apparatuses have heretofore been provided which include male and female members engageable with each other. One such connecting apparatus for mounting an object on a belt is disclosed in my U.S. Pat. No. 4,605,335 and includes a male member with a peculiarly shaped button which mates with a like-shaped opening which leads into a receptacle in a female member, the button then being rotatable to a locked configuration to prevent removal from the receptacle. In this prior arrangement, the button is "plugged" axially into the opening, much like a key is inserted in a keyhole, so that it is insertable in and removable from the receptacle in only one orientation. Once inserted, if it is rotated to any other orientation, it will be locked in place preventing removal.

Other types of connecting apparatuses have used similar arrangements, wherein the receptacle is top-loading so that the button can be slid into the receptacle through its open end rather than being plugged axially thereinto. Such an arrangement is disclosed in my U.S. Pat. No. 5,054,170. That device has the advantage that, while the button can be removed from the receptacle in only one orientation, it can be inserted into the receptacle in any orientation. However, that apparatus utilizes a deflectable detent which, in practice, has a tendency to wear so that, eventually, it does not serve to effectively trap the button in the receptacle.

SUMMARY OF THE INVENTION

It is a general object of the present invention to provide an improved apparatus for detachably interconnecting two objects, which avoids the disadvantages of prior apparatuses while affording additional structural and operating advantages.

An important feature of the invention is the provision of an apparatus of the type set forth minimizes adverse effects of wear.

In connection with the foregoing feature, another feature of the invention is to provide an apparatus of the type set forth, which includes male and female members and which permits the male member to be inserted in the female member in any of the plurality of orientations, while permitting removal of the male member from the female member in only one orientation.

Another feature of the invention is the provision of apparatus of the type set forth which is of relatively simple and economical construction.

These and other features of the invention are attained by providing apparatus for detachably interconnecting two objects including, in combination: a female member adapted to be secured to one of the objects and defining a receptacle and an entrance leading into the receptacle, a male member adapted to be secured to the other object and including a shank with an axis and an enlarged head on the shank adapted for movement into and out of the receptacle through the entrance and rotatable about the axis while in the receptacle, pawl means movable between a locking position projecting into the entrance for interference with passage of the head therethrough and a release position disposed out of the entrance, the head being non-symmetrical with respect to the axis so that while passing through the entrance in one rotational orientation thereof the head will clear the pawl means in its locking position and in all other rotational orientations it will engage the pawl means in its locking position, and bias means resiliently urging the pawl means to its locking position and yieldably accommodating movement of the pawl means to its release position, whereby the pawl means is yieldably movable by the head to permit passage thereof into the receptacle and is non-yieldably engageable by the head to prevent removal thereof from the receptacle in all but the one rotational orientation.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

BRIEF DESCRIPTION OF THE DRAWINGS

For the purpose of facilitating an understanding of the invention, there are illustrated in the accompanying drawings preferred embodiments thereof, from an inspection of which, when considered in connection with the following description, the invention, its construction and operation, and many of its advantages be readily understood and appreciated.

DESCRIPTION OF THE PREFERRED EMBODIMENTS

Figure 1:
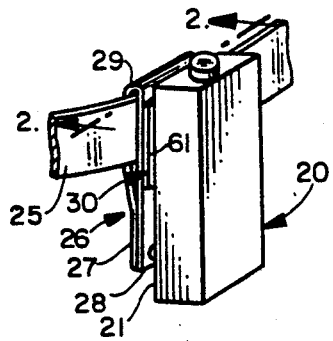
FIG. 1 is a fragmentary perspective view illustrating the mounting of an object on a belt-mountable loop by means of the connecting apparatus of a first embodiment of the present invention.

Referring to FIG. 1, there is illustrated a device 20, which may be in the nature of a radio pager or the like, having a rear wall 21 and adapted to be mounted on a belt 25 by means of a hanger loop 26 which has a pair of legs 27 or 28 interconnected by a bight 29 and connectable at the ends thereof opposite the bight 29 by suitable snaps or the like. If desired, a stiffening plate (not shown) may be secured to the inner surface of the leg 27. The device 20 is detachably mountable on the hanger loop 16 by means of the connecting apparatus 30 of the present invention.

Referring also to FIGS. 2–6, the connecting apparatus 30 includes a female member 31 and a male member 60 which are, respectively, mountable on the leg 27 of the hanger loop 26 and the rear wall 21 of the device 20, for cooperation to mount the device 20 on the hanger loop 26. The female member 31 may be of multi-part construction, including a flat, generally rectangular base plate 32 having four holes 33 formed therethrough, respectively adjacent to the corners thereof. A pin 34 is fixed to the base plate 32 and projects forwardly a slight distance therefrom. The connecting apparatus 30 also includes a cover plate 35 which is also provided with holes 36 therethrough, respectively adjacent to the corners thereof. The cover plate 35 has an elongated slot 37 formed therein from an upper peripheral edge thereof, the slot 37 terminating at a generally U-shaped inner end 38 and having chamfered entrance surfaces 39.

The female member 31 also includes a generally rectangular center plate 40 provided with holes 41 therethrough, respectively adjacent to three of the corners thereof. The center plate 40 has an irregular aperture 42 formed therein from an upper peripheral edge thereof, terminating in an arcuate inner end 43, and having an irregular cutaway portion 44 which removes the fourth corner of the center plate 40. The cutaway portion 44 includes a narrow slot 45 adjacent to the arcuate end 43.

In assembly, the center plate 40 is disposed between the base plate 32 and the cover plate 35, the three plates being stacked in congruent relationship so that the holes 41 are respectively aligned with the holes 33 and 36 for respectively receiving rivets 46 to secure the parts of the female member 31 together. When thus assembled, the slot 37 is aligned with the aperture 42, with the U-shaped end 38 substantially concentric with the arcuate end 43. However, the slot 37 and the U-shaped end 38 are, respectively, smaller than the aperture 42 and the arcuate end 43, so that the peripheral edges of the former extend inwardly beyond the edges of the latter for cooperation therewith and the base plate 32 to define a generally U-shaped receptacle 47 (FIG. 2) having an elongated entrance 48 which opens at the top edge of the female member 31. It will be appreciated that the rivets 46 may also serve to secure the female member 31 to the inner leg 28 of the hanger loop 26.

The female member 31 also includes an elongated pawl 50 having a circular hole 51 therethrough adjacent to one end thereof and provided with a generally semicircular notch 52 therein along the upper edge thereof, the lower edge thereof defining a bearing surface 53. The apertured end of the pawl 50 is disposed at the cutaway corner of the cutaway portion 44 of the center plate 40, between the base plate 32 and the cover plate 35, being pivotally movable about the adjacent one of the rivets 46, which passes through the hole 51. More specifically, the pawl 50 is pivotally movable between a locking position, illustrated in FIGS. 2, 4 and 5, disposed against the pin 34 so that the pin 34 rests in the notch 52, and a release position, illustrated in FIG. 3, pivoted clockwise away from the pin 34 into the lower end of the cutaway portion 44. A leaf spring 55 has one end thereof fixedly seated in the slot 45 and has the other end thereof resiliently bearing against the bearing surface 53 of the pawl 50, resiliently to urge it to its locking position. As can best be seen in FIG. 2, in its locking position the pawl projects a predetermined distance into the entrance 48 of the receptacle 47, whereas in its release position it is disposed out of the entrance 48.

The male member 60 includes a rectangular plate 61 (FIGS. 1 and 6), which may be substantially congruent with the female member 31, and which may be secured by rivets or other suitable fasteners (not shown) to the rear wall 21 of the device 20. The central portion of the plate 61 may be raised to defined a rectangular channel which extends between the top and bottom edges of the plate 61 substantially parallel to the side edges thereof, in the manner illustrated in the aforementioned U.S. Pat. No. 5,054,170. A stud 65 is fixed to the plate 61 centrally thereof and projects rearwardly therefrom. The stud 65 may include a cylindrical shank 66 provided at its distal end with an enlarged, disk-like, part-circular head 67 which is coaxial with the shank 66 and is truncated along a chord thereof to define a straight side edge 68.

Figure 2:
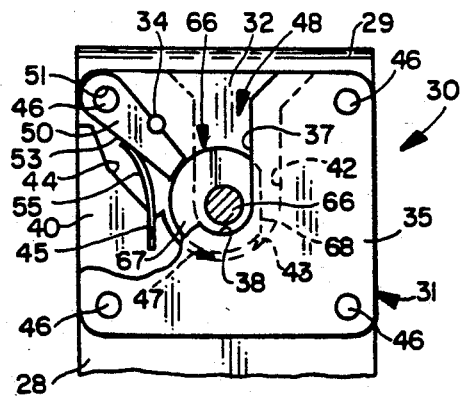
FIG. 2 is an enlarged, fragmentary, sectional view taken along the line 2—2 in FIG. 1, with portions broken away more clearly to illustrate the construction.
Figure 3:
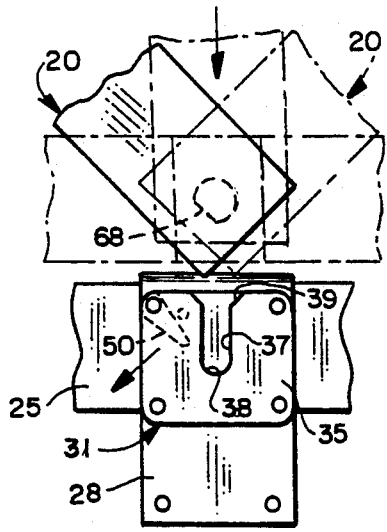
FIG. 3 is a reduced view similar to FIG. 2, but with the two objects disconnected, and with the object carrying the male connector shown in phantom in various orientations.

Referring now in particular to FIGS. 2–5, the operation of the connecting apparatus 30 will be described. It will be appreciated that the female member 31 is mounted on the hanger loop 26 so that, in use, the receptacle 47 will open upwardly when the hanger loop 26 is mounted on the belt 25 of a user. Thus, the female member 31 defines an open-top or top-loading receptacle 47. In use, the device 20 is positioned with the male member 60 facing the female member 31 and substantially parallel thereto, as indicated in FIG. 3. The head 67 of the stud 65 is then inserted into the open entrance 48 of the receptacle 47 and slid downwardly in the direction of the arrow in FIG. 3, with the shank 66 extending through the slot 37 in the cover plate 35.

The head 67 has a diameter substantially greater than the width of the slot 37 in the cover plate 35 and slightly less than the width of the receptacle 47, which is defined by the diameter of the arcuate end 43 of the center plate aperture 42. The straight side edge 68 of the head 67 is so dimensioned and positioned that, when it is disposed facing the pawl 50, the head 67 will clear the pawl 50 in its locking position as the head 67 moves into the receptacle 47. In any other rotational orientation of the device 20 about the axis of the stud shank 66, the pawl 50 in its normal locking position will interfere with the passage of the head 67 into the receptacle 47. However, the leaf spring 55 permits the pawl 50 to be cammed to its release position by the head 67 to permit passage of the head 67 into the receptacle 47. Accordingly, it is a significant aspect of the invention, that the male member 60 may be engaged with the female member 31 in any rotational orientation of the device 20, as indicated in FIG. 3.

Figures 4, 5:
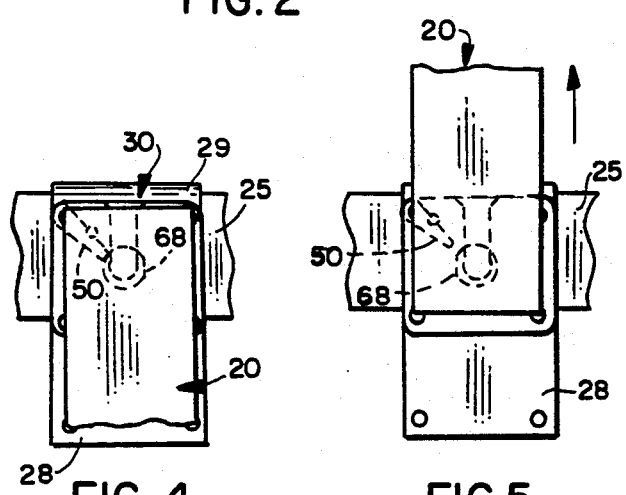
FIG. 4 is a rear elevational view of the assembly of FIG. 1.
FIG. 5 is a view similar to FIG. 4, but with the object rotated 180° to permit disconnection.
Figure 6:
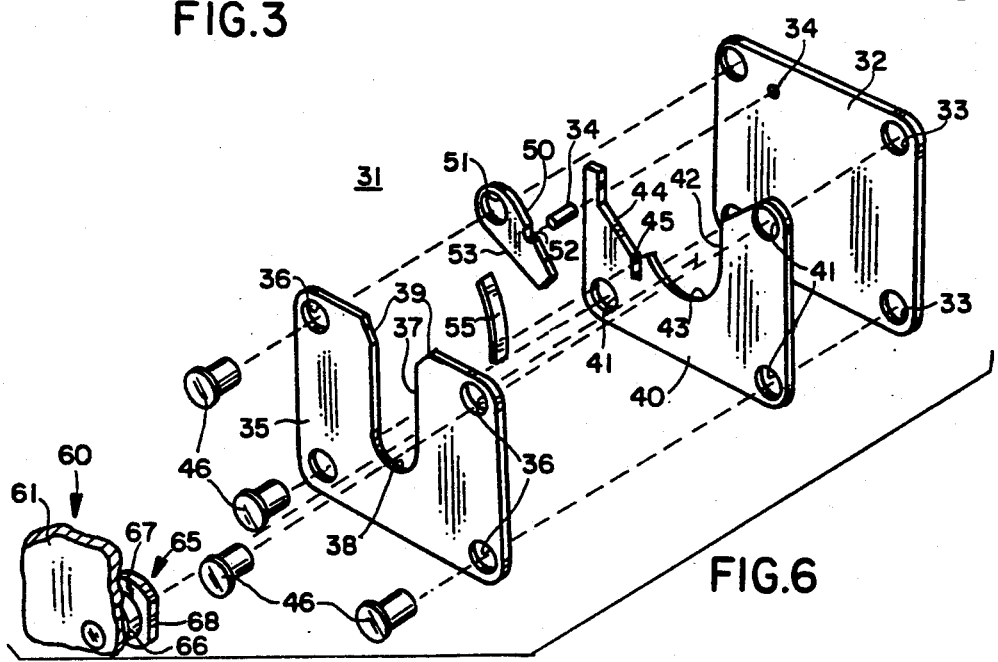
FIG. 6 is an enlarged, perspective, exploded view of the connecting apparatus of FIG. 1.
Figure 7:
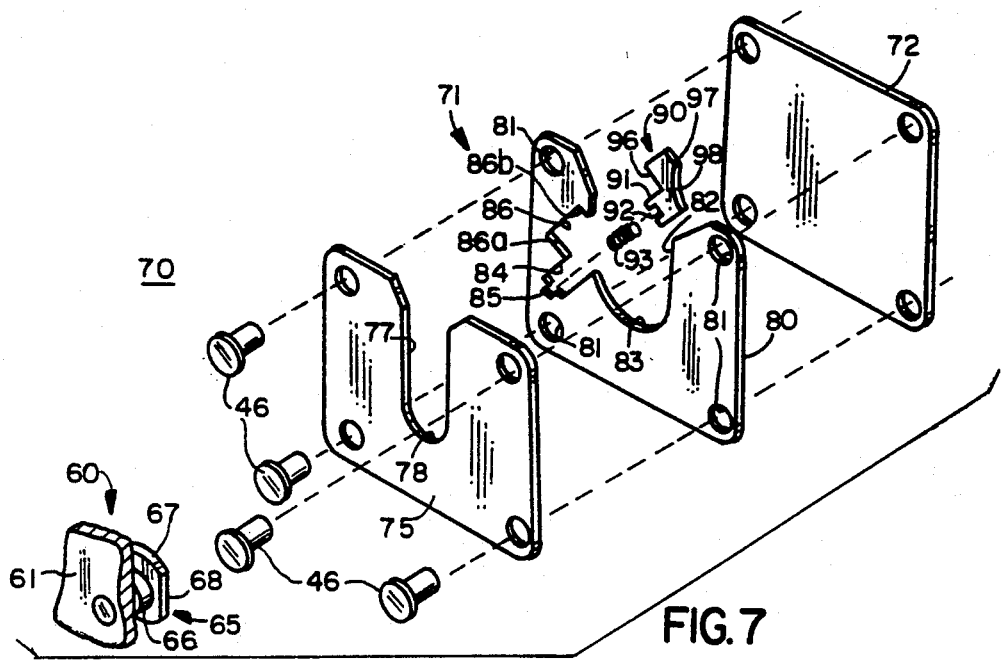
FIG. 7 is a view similar to FIG. 6, of a connecting apparatus in accordance with another embodiment of the invention.
Figure 8:
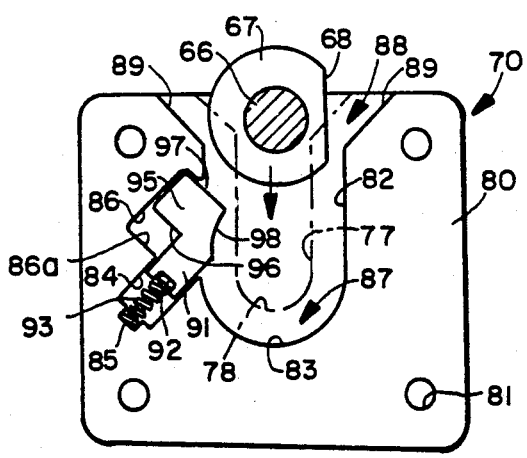
FIG. 8 is an enlarged front elevational view of the assembled connecting apparatus of FIG. 7, with the cover plate removed and illustrated in phantom, showing the male member being inserted into the entrance of the receptacle in the female member.

Once the head 67 is seated in the inner end of the receptacle 47, the pawl 50 will spring back to its locking position, under the urging of the leaf spring 55, as indicated in FIG. 2. Thus, the head 67 is trapped in the receptacle 47, since it is too large to pass through the slot 37 in the cover plate 35. The head 67 is then freely rotatable in the receptacle 47 to bring the device 20 to its normal use orientation, illustrated in FIG. 4, which is preferably with the straight side edge 68 of the head 67 facing away from the pawl 50. It can be seen that, in this orientation, the pawl 50 prevents removal of the head 67 from the receptacle 47. Indeed, removal is prevented in any rotational orientation of the device 20 except the one wherein the straight side edge 68 of the head 67 faces the pawl 50, as illustrated in FIG. 5. In this single orientation, the pawl 50 will not interfere with passage of the head 67 from the receptacle 47 so that the male member 60 can be disconnected from the female member 31 by moving it in the direction of the arrow of FIG. 5.

Referring now to FIGS. 7–11, there is illustrated an alternative form of connecting apparatus, generally designated by the numeral 70, in accordance with another embodiment of the invention. The connecting apparatus 70 includes the same male member 60 as was used with the connecting apparatus 30, and includes a female member 71 which is similar to the female member 31, differing primarily in the formation of the center plate and the pawl. More specifically, the female member 71 includes a base plate 72 which is substantially identical to the base plate 32, except that it does not include the pin 34. The female member 70 also includes a rectangular cover plate 75 which is virtually identical to the cover plate 35, having an elongated slot 77 formed in an upper edge thereof and terminating in a U-shaped end 78.

The female member 71 includes a center plate 80 which has four holes 81 therethrough adjacent to the corners thereof and an aperture 82 formed in an upper edge thereof and terminating at an arcuate inner end 83. To one side of the arcuate end 83, the aperture 82 defines a rectangular notch 84 having a small rectangular recess 85 at its inner end. Projecting laterally from the notch 84 adjacent to its outer end and extending substantially perpendicular thereto is another rectangular notch 86 defining lower and upper stop surfaces 86a and 86b.

In assembly, the plates 72, 75 and 80 are secured together by rivets 46 in the same manner as was described above in connection with the connecting apparatus 30. The aperture 82 cooperates with the base plate 72 and the cover plate 75 to define a receptacle 87 having an elongated entrance 88 having chamfered upper end surfaces 89.

Disposed in the aperture 82 is a pawl 90 which has a rectangular leg 91 disposable in the notch 84 and provided at its distal end with a short rectangular recess 92. A helical compression spring 93 has one end thereof seated in the recess 85 and the other end thereof seated in the pawl recess 92 for resiliently urging the pawl 90 outwardly of the notch 84. The pawl 90 also has a leg 95 which projects laterally from the leg 91 substantially perpendicular thereto for disposition in the notch 86, but having a width substantially less than that of the notch 86. The leg 95 has opposed upper and lower side surfaces 96 and 97, respectively disposed for engagement with the stop surfaces 86a and 86b. The pawl 90 includes an arcuate surface 98 disposed at the junction between the legs 91 and 95.

In use, the pawl 90 is adapted for reciprocating sliding movement in the aperture 82 in directions oblique to the direction of the receptacle entrance 88. Specifically, the pawl 90 moves between a locking position, illustrated in FIGS. 8, 10 and 11, wherein the side surface 97 is resiliently urged by the spring 93 against the stop surface 86b, and wherein the pawl 50 projects a predetermined distance into the entrance 88 of the receptacle 87, and a release position, illustrated in FIG. 9, disposed out of the entrance 88. Movement of the pawl 90 in the direction of its release position is limited by engagement of the side surface 96 with the stop surface 86a.

Figure 9:
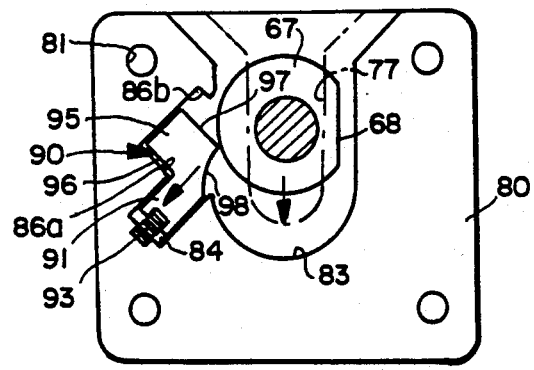
FIG. 9 is a view similar to FIG. 8, illustrating movement of the pawl in response to further passage of the male member into the receptacle.
Figure 10:
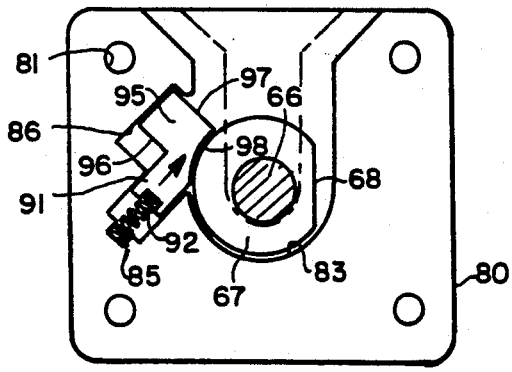
FIG. 10 is a view similar to FIG. 9, illustrating seating of the male member in the receptacle.
Figure 11:
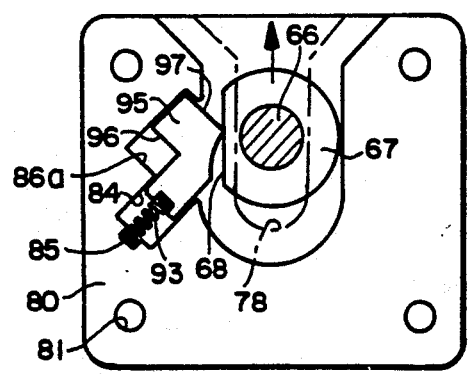
FIG. 11 is a view similar to FIG. 10, illustrating removal of the male member from the receptacle.

The operation of the connecting apparatus 70 is substantially the same as that of the connecting apparatus 30. More specifically, the head 67 of the male member 60 may be inserted, in any rotational orientation thereof, into the receptacle 87, by engaging the pawl 90 and camming it to its release position, against the urging of the spring 93, as indicated in FIG. 9. Once the head 67 is disposed in the receptacle 87, the pawl 90 springs back to its locking position wherein it cooperates with the base plate 72 and the cover plate 75 to trap the head 67 in the receptacle 87 in all rotational orientations except that in which the straight side edge 68 of the head 67 is disposed facing the pawl 90 as illustrated in FIG. 11. In that one rotational orientation of the male member 60, the head 67 will clear the pawl 90 in its locking position so as to permit disconnection of the male member 60 from the female member 31.

In a constructional model of the invention, the male member 60 and the female members 31 and 71 are formed of metal, but it will be appreciated that they could be formed of other suitable materials. Also, while the female members 31 and 71 are illustrated as being of multi-part construction, other constructions would be possible to achieve the same results.

From the foregoing, it can be seen that there has been provided an improved connecting apparatus which is of simple and economical construction, and which provides ready engagement of two parts in multiple orientations while permitting disengagement in only a single orientation, while minimizing wear on the parts.

I claim:

1. Apparatus for detachably interconnecting two objects including, in combination: a female member adapted to be secured to one of the objects and defining a receptacle and an entrance leading into said receptacle, a male member adapted to be secured to the other object and including a shank with an axis and an enlarged head on said shank adapted for movement into and out of said receptacle through said entrance and rotatable about said axis while in said receptacle, pawl means movable between a locking position projecting into said entrance for interference with passage of said head therethrough and a release position disposed out of said entrance, said head being non-symmetrical with respect to said axis so that while passing through said entrance in one rotational orientation thereof said head will clear said pawl means in its locking position and in all other rotational orientations it will engage said pawl means in its locking position, and bias means resiliently urging said pawl means to its locking position and yieldably accommodating movement of said pawl means to its release position, whereby said pawl means is yieldably movable by said head to permit passage thereof into said receptacle and is non-yieldably engageable by said head to prevent removal thereof from said receptacle in all but said one rotational orientation.

2. The apparatus of claim 1, wherein said head and said receptacle are arranged so that said head is moved into and out of said receptacle in directions substantially perpendicular to said axis.

3. The apparatus of claim 2, wherein said entrance defines a slot leading into said receptacle.

4. The apparatus of claim 1, wherein said pawl projects into said entrance in a direction transverse to the direction of movement of said head into and out of said receptacle.

5. The apparatus of claim 1, and further comprising means mounting said pawl means on said female member for reciprocating movement between the locking and release positions thereof.

6. The apparatus of claim 5, wherein said pawl moves in a direction oblique to the direction of movement of said head into and out of said receptacle.

7. The apparatus of claim 5, wherein said pawl means is slidably movable between the locking and release positions thereof.

8. The apparatus of claim 1, wherein said bias means includes a spring.

9. The apparatus of claim 1, and further comprising means mounting said pawl means for pivotal movement between the locking and release positions thereof.

10. The apparatus of claim 1, wherein said head is a part-circular disk having a straight side edge along a chord of the disk.

11. The apparatus of claim 1, and further comprising stop means for limiting movement of said pawl means in the locking and release positions thereof.

12. Apparatus for detachably interconnecting two objects including, in combination: a female member adapted to be secured to one of the objects and having a front surface and an aperture in said front surface which extends to a peripheral edge thereof and has an open end thereat, said female member having a receptacle formed therein behind said front surface, said receptacle being larger than said aperture and communicating with the entire area of said aperture and having an entrance which opens at a peripheral edge of said female member adjacent to the open end of said aperture, a male member adapted to be secured to the other object and having a shank projecting therefrom and a head at the distal end of said shank, said head being dimensioned to prevent passage thereof through said aperture in directions normal to said front surface but to accommodate movement to and from said receptacle in directions parallel to said front surface from said peripheral edge thereof with said shank extending through said opening and further to accommodate rotation of said head about the axis of said shank while in said receptacle, pawl means, means mounting said pawl means on said female member for reciprocating movement between a locking position projecting into said entrance for interference with passage of said head therethrough in directions parallel to said front surface and a release position disposed out of said entrance, said head being non-symmetrical with respect to said axis so that while passing through said entrance in one rotational orientation thereof said head will clear said pawl means in its locking position and in all other rotational orientations it will engage said pawl means in its locking position, and bias means resiliently urging said pawl means to its locking position and yieldably accommodating movement of said pawl means to its release position, whereby said pawl means is yieldably deflectable by said head to permit passage thereof into said receptacle in directions parallel to said front surface and is non-yieldably engageable by said head to prevent removal thereof from said receptacle in all but said one rotational orientation.

13. The apparatus of claim 12, wherein said bias means is a helical compression spring.

14. The apparatus of claim 13, wherein said pawl means is adapted to move obliquely relative to the direction of movement of said head into and out of said receptacle.

15. The apparatus of claim 14, wherein said pawl means is slidably movable between the locking and release positions thereof.

16. The apparatus of claim 12, wherein said head is a part-circular disk having a straight side edge along a chord of the disk.

17. The apparatus of claim 12, wherein said female member includes three interconnected stacked plates including an inner plate connected to the associated object and an outer plate and middle plate, said outer plate having a notch formed therethrough at the periphery thereof and extending toward the center thereof, said middle plate having an aperture formed therethrough larger than said notch and overlapping the entire area of said notch for cooperation with said inner and outer plates to define said receptacle, said pawl means being disposed in said aperture between said inner and outer plates.

18. The apparatus of claim 17, wherein said aperture defines stop surfaces on said middle plate for respectively limiting movement of said pawl means in the locking and release positions thereof.

19. Apparatus for detachably interconnecting two objects including, in combination: a female member adapted to be secured to one of the objects and defining a receptacle and an entrance leading into the receptacle, a male member adapted to be secured to the other object and including a shank with an axis and an enlarged head on said shank adapted for movement into and out of said receptacle through said entrance and rotatable about said axis while in said receptacle, retaining means resiliently biased to a locking position projecting into said entrance for interference with passage of said head therethrough, said retaining means being yieldably movable to a release position accommodating passage of said head through said entrance, said head being non-symmetrical with respect to said axis so that while passing through said entrance in one rotational orientation thereof said head will clear said retaining means in its locking position and in all other rotational orientations it will engage said retaining means in its locking position, said retaining means being yieldably movable to its release position in response to engagement by said head during passage thereof into said receptacle and being non-yieldably engageable by said head in said receptacle to prevent removal thereof from said receptacle in all but said one rotational orientation.

20. The apparatus of claim 19, wherein said retaining means includes a pawl movable between the locking and release positions, and bias means resiliently urging said pawl to said locking position.

* * * * *